US007538685B1

(12) United States Patent
Cooper et al.

(10) Patent No.: US 7,538,685 B1
(45) Date of Patent: May 26, 2009

(54) USE OF AUDITORY FEEDBACK AND AUDIO QUEUES IN THE REALIZATION OF A PERSONAL VIRTUAL ASSISTANT

(75) Inventors: Robert Samuel Cooper, Columbia, SC (US); Derek Sanders, Columbia, SC (US); Jeffrey F. McElroy, Columbia, SC (US)

(73) Assignee: Avaya Inc., Basking Ridge, NJ (US)

( * ) Notice: Subject to any disclaimer, the term of this patent is extended or adjusted under 35 U.S.C. 154(b) by 228 days.

(21) Appl. No.: 11/430,207

(22) Filed: May 8, 2006

Related U.S. Application Data (60) Provisional application No. 60/694,772, filed on Jun. 28, 2005.

(51) Int. Cl.
*G08B 25/08* (2006.01)
(52) U.S. Cl. ..................................... 340/692
(58) Field of Classification Search ............. 340/692, 340/457, 7.52, 7.57; 704/231, 246; 379/88.01, 379/88.16
See application file for complete search history.

(56) References Cited

U.S. PATENT DOCUMENTS

| | | | | |
|---|---|---|---|---|
| 6,466,654 | B1 * | 10/2002 | Cooper et al. | 379/88.01 |
| 7,319,992 | B2 * | 1/2008 | Gaos | 706/62 |
| 2004/0225650 | A1 * | 11/2004 | Cooper et al. | 707/3 |
| 2005/0033582 | A1 * | 2/2005 | Gadd et al. | 704/277 |
| 2005/0285741 | A1 * | 12/2005 | Chipchase et al. | 340/572.1 |

\* cited by examiner

*Primary Examiner*—Phung Nguyen
(74) *Attorney, Agent, or Firm*—Chapin IP Law, LLC (57) ABSTRACT

A method, apparatus and computer program product for providing auditory feedback in a personal virtual assistant (PVA) is presented. A user communication is received at the PVA. A determination is made whether an event sound is required in response to the receiving a user communication and upon determination that an event sound is required, an event sound is provided to the user and upon determination that an event sound is not required an event sound is not provided to the user. A response to the communication received from the user is determined and is transmitted to the user.

24 Claims, 4 Drawing Sheets

USE OF AUDITORY FEEDBACK AND AUDIO QUEUES IN THE REALIZATION OF A PERSONAL VIRTUAL ASSISTANT

CROSS REFERENCE TO RELATED APPLICATIONS

The present application claims the benefit of U.S. Provisional Patent Application No. 60/694,772, filed on Jun. 28, 2005, which is incorporated herein by reference.

BACKGROUND

Mobile professionals, such as physicians, attorneys, sales representatives and the like often find it difficult to communicate with clients, customers, colleagues and assistants. These mobile professionals travel frequently and are not accessible via a desk telephone or traditional, wired computer network. They typically employ human assistants to relay important information, maintain their schedules and filter out all unnecessary interruptions. The personal virtual assistant invention allows the mobile professional to access personal, company, and public information, including contacts, schedules, and databases from any interactive device, such as a telephone.

While the deskbound worker has become even more empowered, the typical mobile worker has a cell phone and a laptop. Easily getting access to corporate data and managing communication with others, especially while in transit, can be extremely challenging. One solution to the needs of a mobile worker was realized in the form of a proxy, or Personal Virtual Assistant (PVA), which was available to the user and could help manage and coordinate communications and data access on behalf of the mobile worker.

For PVA to be successful, it had to be powerful (employ a rich feature-set), intuitive/easy-to-use and efficient. If the PVA was not much more convenient than its alternative (calling someone back at the office and asking them to 'get John Smith on the line' or 'what did John say in his last email' or 'put an appointment on my calendar') then it would not be a commercial success or prove to be a useful tool for the mobile professional.

To a large degree, conventional PVAs allowed a worker, using only their voice and a cell phone, to have the capabilities of email (e.g., Microsoft Outlook) and a multi-function phone (plus some) as they would have had had they been sitting at their desk. These capabilities included email features such as read/annotate/forward/email messages, including attachments and finding messages based on sender, status (read, unread), type (email, voice mail, meeting request), priority etc. PVA also allowed a user to listen to/forward/return voice mail messages and to accept meeting requests, list meetings, book meetings and the like. PVA also allowed a user to manage tasks and to call personal and corporate contacts.

PVA also allowed a remote worker to utilize phone features. These features include placing outbound calls—initiate calls in response to a voicemail (e.g. 'return this call'), using a personal or corporate contact or just by saying and keying in a number. A user was also permitted to receive calls with call screening—if the user was in a PVA Session then the user would be alerted of the inbound call and be allowed to talk to that caller (separately or as part of a conference call) or send them to voice mail. The remote user was also able to initiate conference calls and still be able to control each leg of conference. Additional capabilities were also provided.

SUMMARY

Conventional mechanisms such as those explained above suffer from a variety of deficiencies. One such deficiency is the need to provide a very rich feature-set using technology which is far from perfect. Automatic speech recognition (ASR) especially over a cellular connection is imperfect and further the ASR doesn't realize that it is imperfect. For example if a user says "call John Smith" and the ASR thinks the user said "call Jane Smith", the ASR is unaware that it's made a mistake. ASR vendors do return a confidence score with recognition results but these are far from perfect and are best used as general indicators.

Another deficiency with conventional PVAs is the need to accommodate both new and extremely experienced users. Mobile workers—especially type A personalities (many successful sales folks)—will not go to training or read a manual; yet once they adopt a technology that works, they can be extremely loyal and will demand that it do more. As such, there is a natural conflict between the new user—one who wants to take things slowly and be led through an operation—and an experienced user. For example many users of voice mail touch tone interfaces become so accustomed to the sequence of events that they no longer listen to the wording of prompts, rather the prompts mearly serve as placeholders to let them know that they are not lost in the application.

Still another deficiency is the need to let users operate in an operational mode of thought. Less feature rich ASR based email reader systems have failed in the past. These systems structured commands into a typical IVR style menu structure. In such a solution users would have to open their inbox in order to read an email message. The user would then utter some search command to find the right email. If the user then wanted to call someone, they would need to leave the email mode and go open their contacts. Unfortunately people, when they are engaged in an activity, don't operate that way. It is desirable to allow for a very flat grammar, such that a user could say:

User> read my messages from Tom Militello . . .
PVA> talk . . . talk . . . talk
User> call Tom Militello on his mobile phone.

Yet another deficiency with conventional PVAs is the irritancy and time wasting nature of repetitive or useless information. This once again ties into the need to accommodate both new and experienced users. New users don't mind hearing a chatty system that gives the user more information than needed. Imagine the PVA is reading the user an email message. The dialog could sound something like this:

PVA> What can I do for you?
User> Read my first message.
PVA> Your first message, is an email message
PVA> This message is marked urgent.
PVA> It was received on Apr. 28 2005 at 1:47 pm.
PVA> The message was sent from Jason Hucks
PVA> The subject of the message reads
PVA> "Help"
PVA> The body of the message reads
PVA> "Bob, I need your help when you get a moment"
PVA> Message complete
PVA> What can I do for you?

The first time a user uses this system (or in demos) the user might think this was great, "the ability to get my messages while I'm on road". Now, imagine a highly energized mobile worker, who upon calling into the PVA is told "Hello, Bob you have 35 new messages, two of which are urgent" and the user has to wade through the above diatribe every time. It would be easier to think "if it's important, they'll call me" or "I'll hook up the laptop when I get to the hotel", neither of which often happens. Users typically want the most relevant information first and in a form as brief as they can take it. Non-verbal audio plays a huge role in solving this problem.

Some users will be using their PVA for several hours a day. When audio is the only communication channel and a machine is on the other end of the line it is very easy for a user and the PVA to get out of sync—i.e. whose turn is it to speak. This is referred to as "losing state". Before adding audio feedback, this tended happen quite regularly with soft spoken users. For example, if a user said something and the PVA didn't hear then they both just sat there not knowing whose turn it was to speak. To make matters worse the PVA is listening on a grammar which is action related (e.g., call <contact>, read <message>,) whereas the user now questioning if the PVA heard them tentatively says something like "uhmmm . . . hello, anyone there". Once the user barges in with this new utterance, the PVA takes it as a new command—i.e. "the user wants me to cancel what I was doing and is telling me to take some new action". Since "uhmmm . . . hello, anyone there" is not in the grammar, the PVA would try and match it to a list commands that it does understand. If a match is found (pretty common) it would then begin doing something totally unintentional. All the while the user thinks that it's executing the initial command offered. Audio feedback helps eliminate these state errors.

The desktop PC has the concept of an animated hour-glass to let the user know that the current operation may take longer than usual. This same kind of feedback is needed in the audio domain. Without this feedback the user may think they the system has malfunctioned or they weren't heard. If the user barges in during this working time, the system will assume that it is being redirected—i.e. cancel what you're doing and go do something new.

There is also a need to provide for asynchronicity. Imagine a user is using his PVA to listen to a voicemail or has used the PVA to setup a phone call. Recall that in both of these cases, the PVA is monitoring the users activity and also monitoring external events that may need the user's attention—such as an inbound call. These external events are asynchronous and in such cases the PVA needs to tactfully interrupt the user. Other examples of asynchronous external events include a reminder being sent from a desktop messaging application ('10 minutes until your next meeting') or when the PVA is managing multiple lines of a conference call and a user disconnects. Audio feedback plays a big role here as well.

There are other challenges to usability such as keeping the command set small and keeping a consistent mental model (a mental picture of how the application user interface behaves) so that users can quickly understand and remember how to use the product.

Embodiments of the invention significantly overcome such deficiencies and provide mechanisms and techniques that provide audio feedback and audio cues in the realization of a PVA.

In a particular embodiment, a method for providing auditory feedback in a personal virtual assistant (PVA) includes receiving a user communication at the PVA. The method further includes determining whether an event sound is required in response to the receiving a user communication and upon determination that an event sound is required, providing an event sound to the user and upon determination that an event sound is not required then failing to provide an event sound to the user. Additionally, the method includes determining a response to the communication received from the user and transmitting the response to the user communication to the user. The event sound is provided as audio feedback, including audio queues and may comprise non-verbal audio.

Other embodiments include a computer readable medium having computer readable code thereon for providing auditory feedback in a personal virtual assistant (PVA). The medium includes instructions for receiving a user communication at the PVA and instructions for determining whether an event sound is required in response to said receiving a user communication and upon determination that an event sound is required, providing an event sound to the user and upon determination that an event sound is not required then failing to provide an event sound to the user. The medium further includes instructions for determining a response to the communication received from the user, and instructions for transmitting the response to the user communication to the user.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides auditory feedback in a personal virtual assistant as explained herein that when performed (e.g. when executing) on the processor, operates as explained herein within the computerized device to perform all of the method embodiments and operations explained herein as embodiments of the invention. Thus, any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing auditory feedback in a personal virtual assistant as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya Inc. of Lincroft, N.J.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

As discussed above, audio feedback (including audio cues) help alleviate the problems associated with conventional PVAs. These problems are inter-related—for example, the inaccuracies of ASR lead to 'loss of state', the need to accommodate new and experienced users makes the issue of extraneous/repetitive prompts an issue. In particular, the method and apparatus providing auditory feedback in a PVA help a mobile user avoid losing state, preclude being given extraneous information, provide settings to adjust for user speed and experience, and help provide a measure of asynchronicity.

When people communicate face-to-face there are many subtle queues which are used to help keep the parties in sync. For example, if someone says something that you don't quite understand or hear, you may raise your eyebrows, tilt you head or even give a reluctant though questioning 'yea . . . ?'. Of course there are other more direct methods too . . . "what in the world are you talking about". Likewise, consider some of the affordances one has on a PC to address this problem. Take a web browser for example. Just the process of typing in a URL involves the following feedback: an audible click from the mouse to let you know your selection (address field) was noticed, audio and visual feedback of your typing—i.e. you spelled everything right. Often times this is reformatted visually for you, e.g., www.ebay.com is changed to http://www.ebay.com letting you know that the URL was resolved correctly. PCs also generally provide some type of progress indicator—a spinning icon in the upper right corner, a status indicator (implying % complete) in the lower right, etc. Finally the user receives some content in the main body of the page. Thus, on a PC a user receives rich audio, tactile and visual feedback to help the user with state issues.

When the user's only medium is audio, the user's device a cell phone and the remote party a dumb (relatively speaking) computer running ASR algorithms which have no clue about human rules of engagement, state errors show up in all sorts of areas.

One way to address these issues is to provide the user with auditory feedback through the use of "event sounds". One event sound provided by the PVA is an 'Understood Tone'. A user says something to the system, or thinks that they did, how does the user know if the system heard them? After all it could just be processing their request . . . some requests can take a while. To solve this problem an 'understood tone' is played to the user as soon as the system determines a user has spoken a recognizable utterance—one of sufficient length, doesn't appear to be background noise (wind . . . ) and matches something defined in the loaded grammar. This recognize step typically takes less than 500 ms. Given that this tone is played after every valid recognition, in a particular embodiment, the Understood Tone was chosen to be muted and softened such that a user would eventually hear it subconsciously.

Another event sound provided by the present PVA is a 'Working Sound'. Given that some tasks take longer than others, there is a need for a Working Sound. This serves the purpose of the hourglass (or spinning globe . . . ) on the desktop and lets the user know that the PVA is working on their behalf. After the PVA has recognized an utterance from a user, if some result cannot be played back to the user within a timeout period the system will echo a Working Sound to the user. In a particular embodiment, the Working Sound was chosen to be a short repetitive set of tones. When the result is ready, the working sound stops and the PVA replies with the requested result.

Another event sound provided to the user by the present PVA is a 'Logon Sound'. The Logon Sound is played whenever a user calls his/her PVA and is authenticated. Various authentication models are supported. The most transparent is auto-login where a user is automatically logged on based on their calling number. In this mode users typically set auto logon to occur when they call from their personal cell phones. Another mode requests the user to enter their account number and pin. Regardless of approach, once the user has been authenticated a bell-like Logon Sound is played. The Logon Sound serves the purpose of reinforcement and assurance. Users find the inclusion of this tone very welcoming and it reminds them that authentication has been performed which is important since the auto-logon process is so transparent. In a particular embodiment the sound chosen for the Logon sound was a longer, rising warm tone.

Additional event sounds include a 'Record Start/Stop' sound. Using the PVA, people are constantly replying to email and voice mail via voice. That is, when a user replies to an email message the system essentially turns on a voice recorder, records their response and attaches this to the replying email. Given that the PVA is a hands free product, it is important to let the user know exactly when the recorder started and when the recorder stopped. The stop point is determined by silence detection. To accommodate this a pair of sounds—Record Start/Stop Sound—was utilized. The Record Start Sound comprises a two step sequence which rises (low sound, high sound) and the Record Stop sound was chosen as the inverse (high sound, low sound). These are quick and used consistently throughout the product. Potential state errors can occur if a user's voice softens substantially and the system believes that the user has stopped talking when in fact they have not. In such a case the user would hear a distinct Record Stop Sound while they were talking. Without this, they would be talking at the same time as the PVA and most likely not hear/understand what was said or potentially lose state.

Other event sounds include 'Tonal Separators'. Imagine a user needs to use text-to-speech (TTS) to read the content of a typical email message. The user needs to read the header, the subject and the body. Also this needs to be done as efficiently as possible. Rather than doing what was described above in conventional PVA systems:

PVA> The subject of the message reads
PVA> "Help"
PVA> The body of the message reads PVA> "Bob, I need your help when you get a moment"

It makes much more sense to do this:

PVA> with the subject

PVA> "Help"

PVA> <tonal separator>

PVA> "Bob, I need your help when you get a moment"

Without some type of separator, the subject and the body could run together. Even if a delay was used, this wouldn't be sufficient since TTS prosody does not do an adequate job of making the two areas distinct. This is just one example but Tonal Separators are used throughout the entire PVA product. For example, between lists of items—when listing emails, appointments for a day, etc—a typical list operation might look like this:

User> Read my first message

PVA> your first message is from Russ Innes . . . <tonal separator>

PVA> next is from Ross . . . <tonal separator>

PVA> next is a voice message from Yolanda . . . <tonal separator>

Still other event sounds include 'Audio Anchors'. Though not necessarily tonal, frequent and consistent usage of Audio Anchors help eliminate state errors. An Audio Anchor is a spoken phrase or marker that let's the users know where they are in an application. For example whenever the PVA is ready to start a new operation is says "What can I do for you". This phrase does not vary. The same is true when at the beginning and end of an assertion window (see below). In applications which are more tree structured, Audio Anchors are placed at each main branch of any tree.

Yet another event sound is 'Call Handles'. When a person is using a multi-feature desk phone, the user has the luxury of leveraging buttons and lights to control the phone. No such luxury exists when a remote user is re trying to accomplish the same type of operations in a hands free/eyes free environment. To help remedy this, whenever the user is given a call leg (line appearance), the user is also given a call handle (in the form of a number) to the call. For example, if a PVA is hosting a three way call for the user and someone calls the user, the PVA announces the caller's name and tells the subscriber (the user controlling the PVA) the call handle (line 4) of that call. From there the subscriber has a mental model of the call state:

| | |
|---|---|
| Line 1: Jeeth Garag: | in the conference room |
| Line 2: Rick Ulmer: | in the conference room |
| Line 3: Derek Sanders: | in the conference room |
| Line 4: Vladimir Tokarev: | on hold waiting for me to talk to him |
| Line 0 is reserved for the subscriber. | |

Now the user can:

User> put line 4 in the conference room

User> drop line 3

User> drop all lines

User> connect all lines

It is important to be consistent in prompting—i.e. if the PVA is expecting the user to refer to items as 'lines' then all prompts should refer to them the same as this helps to build a consistent mental model. So for example, the process of navigating messages should be equivalent for other items—tasks, appointments, and contacts. The use of tonal separators should also be used for all listed items and between all subparts (subject/body, time/location, . . . ). A consistent model not only helps obviate the need to memorize a bunch of unrelated commands but very much helps eliminate state errors.

It can be a tough challenge to balance the needs of an experienced/frequent/expert user with that of a novice/infrequent user. This challenge is amplified when the only medium is audio. Given this, the challenge is to provide just the right amount of information for the user/task at hand. Consider the case of a user going through their email messages. The most important items a user needs to know are: the type of message (email or voicemail) as people's sense of urgency is very different for these two types of messages, when the message arrived (a relative measure here is more important than an absolute measure in general), who the message is from, is the message urgent, and what the message is about. Less important but necessary in some cases are who else received the message, was the message sent directly to the user or was the user "cc'd" or "bcc'd", when exactly was this message sent/received, does the message contain attachments, and the like. This prioritization may be even more important when listing items.

Conventional PVA:

PVA> What can I do for you?

User> Read my first message.

PVA> Your first message, is an email message

PVA> This message is marked urgent.

PVA> It was received on Apr. 28 2005 at 1:47 pm.

PVA> The message was sent from Jason Hucks

PVA> The subject of the message reads

PVA> "Help"

PVA> The body of the message reads

PVA> "Bob, I need your help when you get a moment"

PVA> Message complete

PVA> What can I do for you?

Could better be conveyed as:

PVA> What can I do for you?

User> Read my first message.

PVA> <understood tone> Your first message if from Jason Hucks

PVA> Delivered just minutes ago

PVA> With the subject "Help"<audio delimiter>

PVA> "Bob, I need your help when you get a moment"

PVA> What can I do for you?

Continuing

User> Next

PVA> <understood tone> Your next message if from Russ Innes

PVA> Delivered yesterday evening

PVA> With the subject "Vacation"<audio delimiter>

PVA> "Bob, Just wanted to let you know I'm going to be on vacation tomorrow."

PVA> What can I do for you?

Message, by default, means email message. Other message types are voice mail message, task request, meeting request, etc. Whenever possible words such as "and the body contains" are replaced with sounds <audio delimiter>. Shaving off a small amount of time and repetition can have tremendous user adoption benefits.

Audio substitution was also employed when internet URLs (hypertext links) were encountered when the PVA was reading email messages. Oftentimes these URL's contained long strings of characters which would make no sense when rendered using a text to speech engine. At first one may think that users want to hear the URL, but users would prefer to hear a tone each time one is encountered to let them know that they are there.

One more consideration is how wise is it to "skip" information or "summarize" information. For example in the snippet above the PVA substituted relative date information for that which is absolute. Also the PVA didn't tell the user the other email recipients. Sometimes a user needs to know this—especially before the user does a 'reply' or 'reply all'. This same issue comes up in all sorts of cases—meeting requests, task requests, etc. The way this was solved was by providing a single consistent mechanism, referred to as "more detail". More Detail is a context sensitive command which when said tells the PVA to recite all relevant information about the topic at hand.

Keeping the user and the PVA in sync is beneficial as is shortening the length of dialogs by replacing words with sounds. Also beneficial is detecting how the number of steps needed to accomplish a task can be reduced.

For example, when a user replies to a message, approximately 80% of the time the user wants the PVA to turn on the recorder, record what is spoken, turn off the recorder and send the message. However sometimes the user may want to do other things such as re-record the message (e.g. the first take was bad), add other recipients to the user's reply, mark the reply urgent, continue recording where the user left off, etc.

The need for these features is balanced without sacrificing the 'default' behavior by way of assertion. Assertion essentially says "I'm going to do the default behavior unless someone tells me otherwise". The goal is to make the typical case as efficient as possible. If the user wants to do the non-default behavior, then the PVA will provide for that, it just may take a little longer. If this behavior doesn't suit the user, 'assertion' is something a user can disable via some user configuration settings.

Sending a message with assertion enabled looks something like this:
PVA> What can I do for you?
User> Send a message to Gurmeet Lamba
PVA> Record after the tone
PVA> <record start tone>
User> talk . . . talk . . . <silence>
PVA> <record stop tone>
PVA> <assertion window started> "Sending message"
PVA> <3 second pause>
PVA> <assertion window ended> "Done"
PVA> What can I do for you?

The word "done" always indicates the closing of the assertion window—a tone could just as easily have served this purpose.

A user can get access to these other features just by interrupting the PVA during the assertion window. Once the PVA notices an interruption during the assertion window it will stop the default behavior and list all the options, so the above example could have looked like this:
PVA> What can I do for you?
User> Send a message to Gurmeet Lamba
PVA> Record after the tone
PVA> <record start tone>
User> talk . . . talk . . . talk . . . <silence>
PVA> <record stop tone>
PVA> <assertion window started> "Sending message"
User> stop
PVA> OK, please say one of the following
PVA> "send the message"
PVA> "review the message"
PVA> "continue recording"
PVA> "add a recipient"
. . .

A user's deskbound experience would be quite different if asynchronous events from the users phone, calendar, Instant Messaging (IM) were not supported. Take the case of an incoming phone call. If ansynchonous evens weren't supported it would be like the user not being able to check to see if his phone was ringing until after the he finished reading a piece of email. In unsuccessful phone-based product attempts in the past, this is exactly what happened—if the user was listening to an email message via a PVA-like product, inbound calls would not interrupt the user and would go straight to voice mail. However the PVA is actually a multitasking entity. Thus while a user may be having his/her email read to them the PVA is monitoring the user's public phone number for inbound calls and monitoring the user's calendar and task lists so that it can alert the user when the user needs a reminder.

This was implemented in the present PVA by mixing audio tones, a different tone per event type. The supported event types include: an "inbound call tone" to signal that a new call had arrived: a "calendar reminder tone" to signal that a calendar reminder has fired i.e. at the same time that Outlook pushes a meeting reminder to your desktop, the PVA mixes a calendar reminder tone with the audio currently being streamed to your ear—whether it's a TTS rendering of email, audio from an voice mail message or audio from a live call; a "task reminder tone" to sequence when a task reminder has fired; and an "administrative tone" warning when a system administrator needs to do something to the system which would affect the user's session, e.g. take the system down for maintenance.

Below is an example where a user is listening to a message and a call comes in:
PVA> What can I do for you?
User> Read my urgent messages from Jeff McElroy
PVA> <Jeff McElroy> Your first urgent message . . .
PVA> talk . . . talk . . . talk . . .
PVA> talk . . . <inbound call tone played to user> . . . talk . . .
User> stop
PVA> you have a call from <Al Schumann> would you like to take this call?
User> yes
PVA> connecting to line 1<connection tone>
User+Line1> <connected>

Notice that only the tone is played to the user while they are reading this message. From this tone the user knows the type of event but not, in this case, the caller's identity. This was deliberate in that if the user gets a lot of inbound calls or had a lot of reminders firing it could get distracting. It's up to the user to decide whether he/she wants to stop what they are doing to get more information. In the above example if the user didn't respond to the PVA event within a timeout period, the PVA would tell the caller that the subscriber is unavailable and offer to take a message. Another implementation is to allow the subscriber to tune the amount of detail conveyed with a specific event type.

There are certain interactions which have been made extremely efficient as long as the user is 'properly accustomed' to recognize them. Consider the case where the PVA did not recognize what the user said. One approach is to say something like:
User > read my first message
PVA> I'm sorry, could you say that again
User > read my first message
PVA> I'm sorry, I didn't understand you
The PVA could try to help the user along . . . "try to talk louder", "eliminate any background noise", etc. even back off and try to suggest commands. That's all well and good for a new user however once the user is experienced with the system these prompts provide little if any value to the user, all the user really needs to know is that the PVA didn't understand them. Given this, it is beneficial to replace these useless words with a substitute sound (an "Unrec" Sound).

The Unrec Sound was chosen with great care as (1) it would be played more often than any other tone and (2) it would be the bearer of bad news. A soft short distinct tone was selected for this.

There were other areas in which repetitive prompts could be replaced with tones. For example the "what can I do for you" anchor, any "yes/no" question, any time the PVA needed to prompt the user to say a contact's name, at the beginning and end of the assertion window etc. In a purely theoretical sense, anything other than dynamic content could be replaced by a corresponding tone.

The PVA can be designed such that as a user gains experience the system's prompts become shorter and shorter. The way it worked in a particular embodiment was that four levels of verbosity were defined as follows:

Level 1=longer prompts and little to no audio feedback;
Level 2=slightly shorter prompts and begin introducing audio feedback;
Level 3=shorten prompts more and begin substituting the audio feedback for words and
Level 4=shortest prompts and aggressive substitution.

There should be a direct correlation between these levels and a user's level of experience. Depending on the user's experience, the PVA would gradually phase out wordy prompt and begin substituting tones in their place. A related feature is one in which a user manually adjusts prompt verbosity. The adjustment is one in which a user controls via a personal configuration panel, and though it does not do any tone/prompt replacement, it does allow the user to modify the length of prompts. Consider the two dialogs:

Verbosity=High
PVA> What can I do for you
User> Send a message
PVA> To whom would you like to send a message
User> Jim Brigman
PVA> <Jim Brigman> Is this correct?
User> yes
...
Now consider the same tasks with Verbosity=Lower
PVA> What can I do for you
User> Send a message
PVA> To whom?
User> Jim Brigman
PVA> <Jim Brigman> Correct?
User> yes
...

Figure 1:
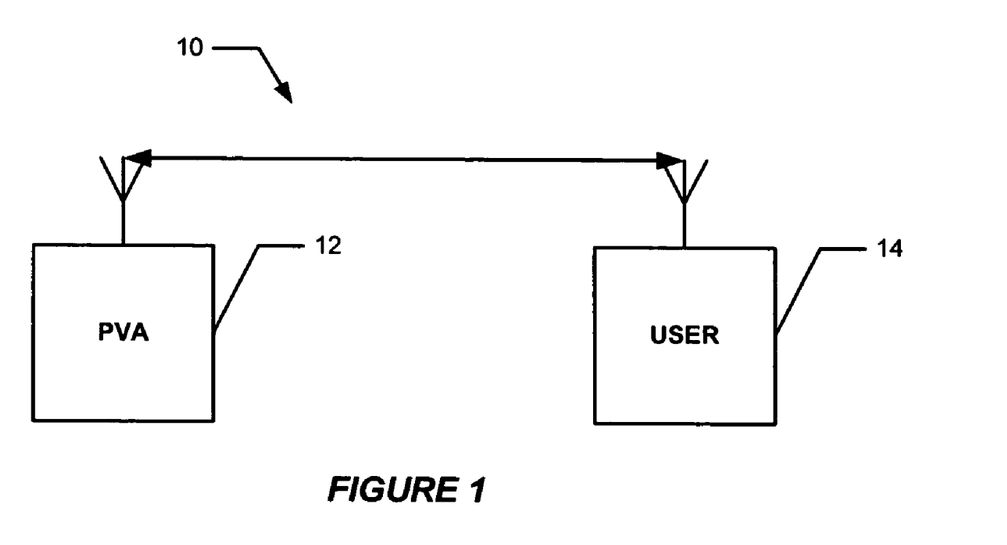
FIG. 1 depicts a block diagram of an environment showing a PVA and a user.
Figure 2A:
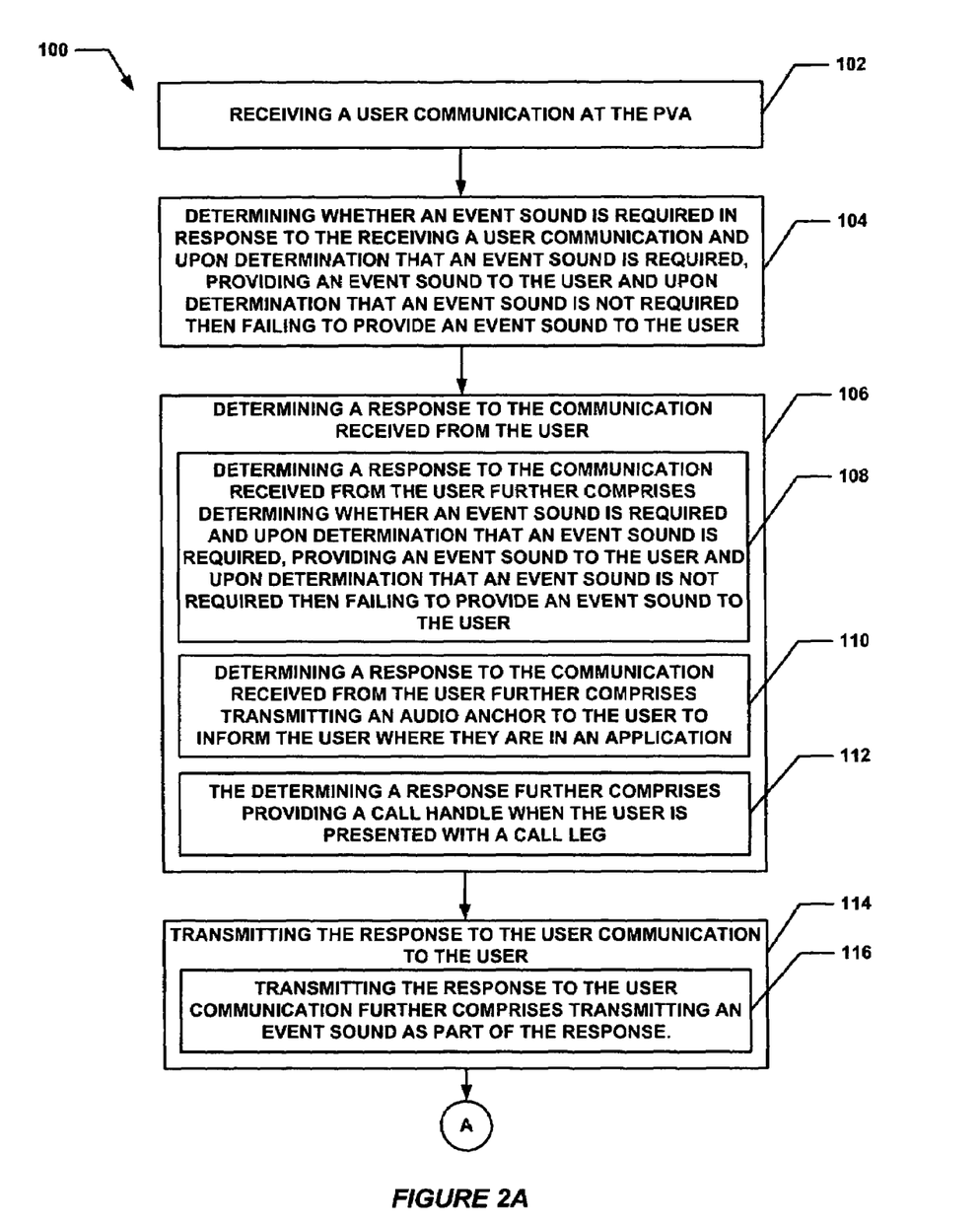
FIGS. 2A and 2B comprise a flow diagram of a particular method for providing auditory feedback in a PVA in accordance with embodiments of the invention.
Figure 2B:
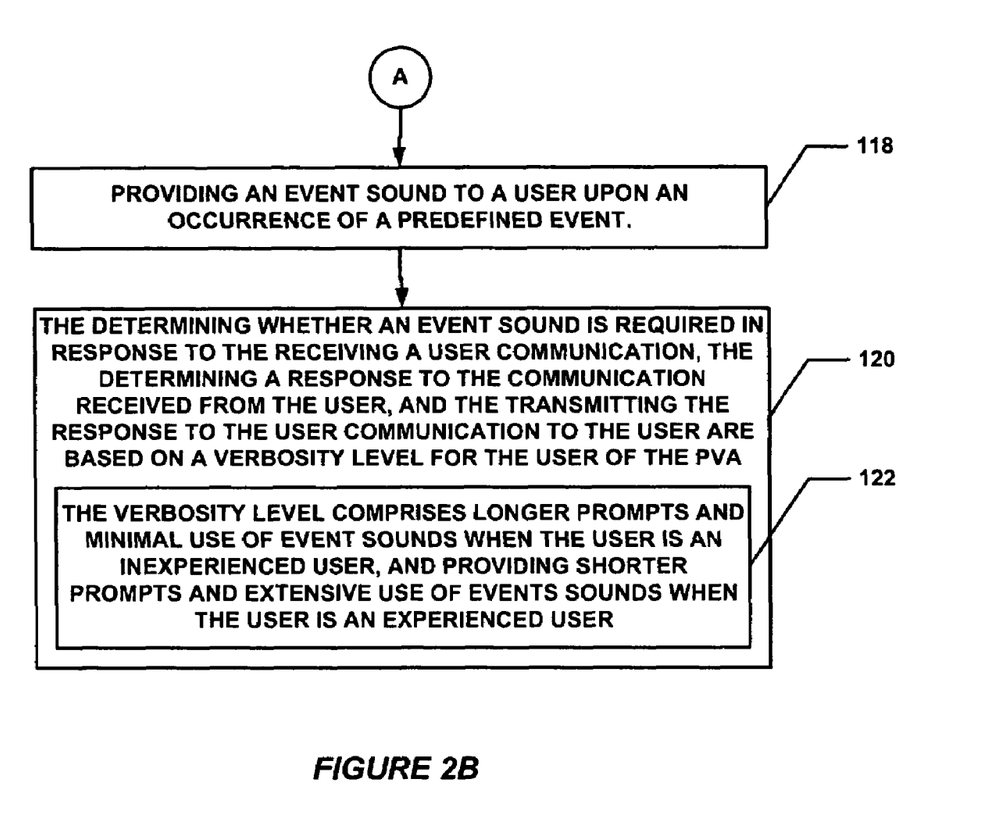

A flow chart of the presently disclosed method is depicted in FIGS. 2A and 2B. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 2A and 2B, a flow diagram of a particular embodiment of a method 100 or providing auditory feedback in a personal virtual assistant is shown. The method 100 begins with processing block 102 which discloses receiving a user communication at the PVA.

Processing block 104 states determining whether an event sound is required in response to said receiving a user communication and upon determination that an event sound is required, providing an event sound to the user and upon determination that an event sound is not required then failing to provide an event sound to the user.

Processing continues at processing block 106 which recites determining a response to the communication received from the user. As recited in processing block 108, determining a response to the communication received from the user further comprises determining whether an event sound is required and upon determination that an event sound is required, providing an event sound to the user and upon determination that an event sound is not required then failing to provide an event sound to the user. As further recited in processing block 110, determining a response to the communication received from the user further comprises transmitting an event sound to the user to inform the user where they are in an application. Additionally, as disclosed in processing block 112, in certain embodiments determining a response further comprises providing a call handle when the user is presented with a call leg.

Processing block 114 states transmitting the response to the user communication to the user. This may include, as shown in processing block 116, transmitting an event sound as part of the response. Processing block 118 recites providing an event sound to a user upon an occurrence of a predefined event.

Processing block 120 discloses the determining whether an event sound is required in response to the receiving a user communication, the determining a response to the communication received from the user, and said transmitting the response to the user communication to the user are based on a verbosity level for the user of the PVA. As further recited in processing block 122, the verbosity level comprises longer prompts and minimal use of event sounds when the user is an inexperienced user, and providing shorter prompts (or no prompts at all) and extensive use of events sounds when the user is an experienced user.

Figure 3:
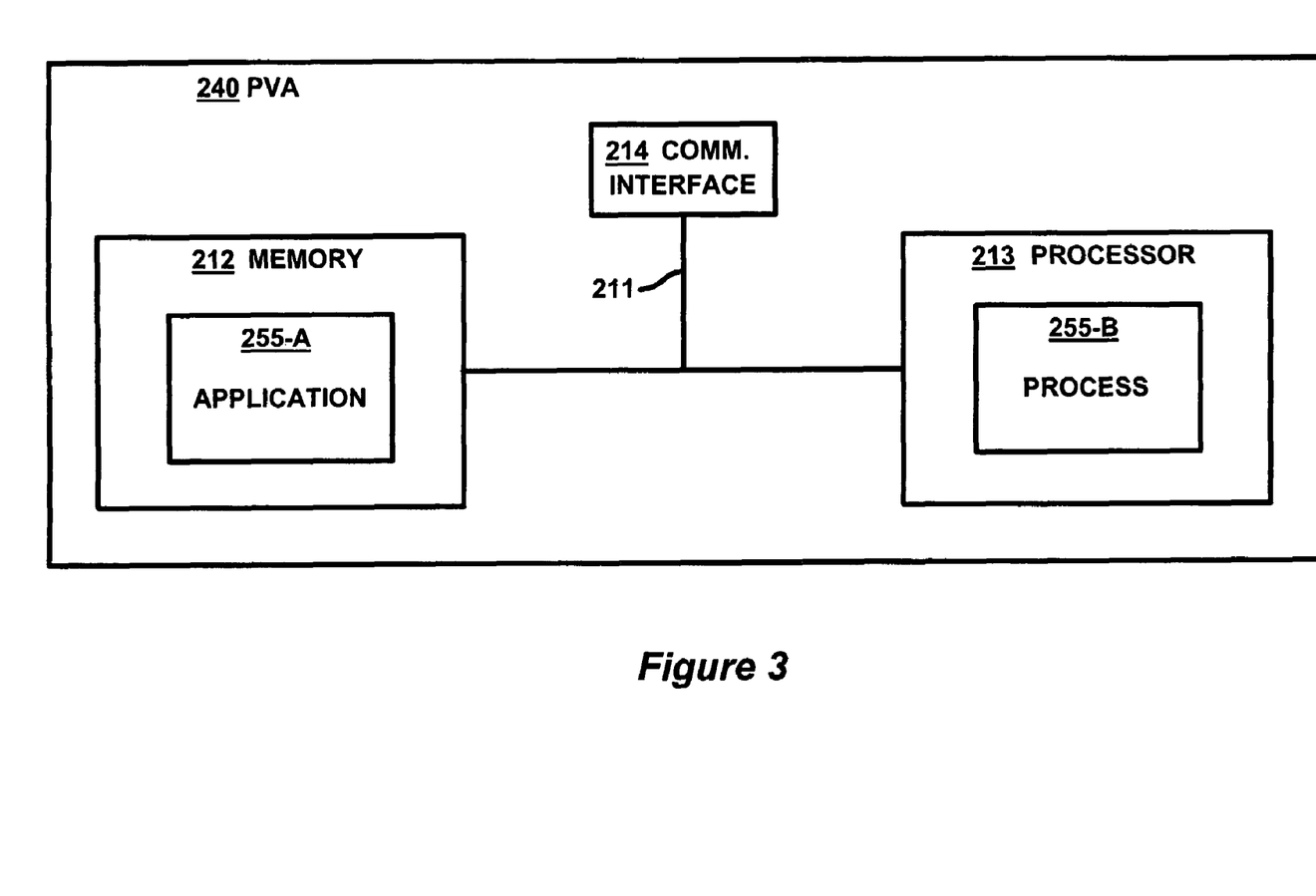
FIG. 3 illustrates an example PVA architecture for a system that provides auditory feedback in a PVA in accordance with embodiments of the invention.

FIG. 3 illustrates example architectures of a PVA 240. The PVA 240 may be any type of computerized system such as a personal computer, workstation, portable computing device, mainframe, server or the like. In this example, the PVA 240 includes an interconnection mechanism 211 that couples a memory system 212, a processor 213, and a communications interface 214. The communications interface 214 allows the PVA 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention as explained above. The processor 213 can access the memory system 212 via the interconnection mechanism 211 in order to launch, run, execute, interpret or otherwise perform the logic instructions of the applications 255-A for the PVA in order to produce a corresponding process 255-B. In other words, the process 255-B represents one or more portions of the application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method of providing auditory feedback in a personal virtual assistant (PVA), in which a computer system performs operations comprising:
   receiving a user communication at the PVA;
   determining whether an event sound is required in response to said receiving a user communication and upon determination that the event sound is required, providing the event sound to the user and upon determination that the event sound is not required then failing to provide the event sound to the user;
   determining a response to the communication received from the user;
   transmitting the response to the user communication to the user; and
   wherein said determining whether an event sound is required in response to said receiving the user communication, said determining a response to the communication received from the user, and said transmitting the response to the user communication to the user are based on a verbosity level for said user of said PVA and wherein a user is implicitly migrated to a most efficient verbosity level the user can handle by said PVA and wherein said verbosity level comprises longer prompts and minimal use of event sounds when the user is an inexperienced user, and providing shorter prompts and extensive use of events sounds when the user is an experienced user.

2. The method of claim 1 wherein said determining a response to the communication received from the user further comprises determining whether the event sound is required and upon determination that the event sound is required, providing the event sound to the user and upon determination that the event sound is not required then failing to provide the event sound to the user.

3. The method of claim 1 wherein said transmitting the response to the user communication further comprises transmitting the event sound as part of said response.

4. The method of claim 1 wherein said determining a response to the communication received from the user further comprises transmitting an audio anchor to the user to inform the user where they are in an application.

5. The method of claim 1 wherein said determining a response further comprises providing a call handle when the user is presented with a call leg, when the call leg drops, when a call leg joins a conference call, and when a call leg leaves a conference call.

6. The method of claim 1 further comprising providing the event sound to the user upon an occurrence of a predefined event.

7. The method of claim 1 wherein the event sound is selected from the group consisting of a record start/stop sounds, a working sound, an understood tone, a logon sound, a task due sound, a calendar reminder sound, and an inbound call sound.

8. The method of claim 1 wherein the user of said PVA can manually override the verbosity level set for said user by said PVA.

9. A computer readable storage medium having computer readable code thereon for providing auditory feedback in a personal virtual assistant (PVA), the medium including instructions in which a computer system performs operations comprising:
   receiving a user communication at the PVA;
   determining whether an event sound is required in response to said receiving a user communication and upon determination that the event sound is required, providing the event sound to the user and upon determination that the event sound is not required then failing to provide the vent sound to the user;
   determining a response to the communication received from the user;
   transmitting the response to the user communication to the user; and
   wherein said determining whether the event sound is required in response to said receiving a user communication, said determining a response to the communication received from the user, and said transmitting the response to the user communication to the user are based on a verbosity level for said user of said PVA and wherein the user is implicitly migrated to a most efficient verbosity level the user can handle by said PVA and wherein said verbosity level comprises longer prompts and minimal use of event sounds when the user is an inexperienced user, and providing shorter prompts and extensive use of events sounds when the user is an experienced user.

10. The computer readable storage medium of claim 9 wherein said instructions for determining a response to the communication received from the user further comprises instructions for determining whether the event sound is required and upon determination that the event sound is required, providing the event sound to the user and upon determination that the event sound is not required then failing to provide the event sound to the user.

11. The computer readable storage medium of claim 9 wherein said instructions for transmitting the response to the user communication further comprises instructions for transmitting the event sound as part of said response.

12. The computer readable storage medium of claim 9 wherein said instructions for determining a response to the communication received from the user further comprises instructions for transmitting an audio anchor to the user to inform the user where they are in an application.

13. The computer readable storage medium of claim 9 wherein said instructions for determining a response further comprises instructions for providing a call handle when the user is presented with a call leg.

14. The computer readable storage medium of claim 9 further comprising instructions for providing an event sound to a user upon an occurrence of a predefined event.

15. The computer readable storage medium of claim 9 wherein said instructions for determining the event sound select the event sound from the group consisting of a record start/stop sounds, a working sound, an understood tone, a logon sound, a task due sound, a calendar reminder sound, and an inbound call sound.

16. The computer readable storage medium of claim 9 wherein the user of said PVA can manually override the verbosity level set for said user by said PVA.

17. A personal virtual assistant (PVA) system comprising:
a memory;
a processor;
a communications interface;
an interconnection mechanism coupling the memory, the processor and the communications interface; and
wherein the memory is encoded with a personal virtual assistant application that when performed on the processor, provides a personal virtual assistant process for processing information, the personal virtual assistant process causing the PVA system to perform the operations of:
receiving a user communication at the PVA;
determining whether an event sound is required in response to said receiving a user communication and upon determination that the event sound is required, providing the event sound to the user and upon determination that the event sound is not required then failing to provide the event sound to the user;
determining a response to the communication received from the user;
transmitting the response to the user communication to the user; and
wherein said determining whether the event sound is required in response to said receiving a user communication, said determining a response to the communication received from the user, and said transmitting the response to the user communication to the user are based on a verbosity level for said user of said PVA and wherein the user is implicitly migrated to a most efficient verbosity level the user can handle by said PVA and wherein said verbosity level comprises longer prompts and minimal use of event sounds when the user is an inexperienced user, and providing shorter prompts and extensive use of events sounds when the user is an experienced user.

18. The PVA of claim 17 wherein said determining a response to the communication received from the user further comprises determining whether the event sound is required and upon determination that the event sound is required, providing the event sound to the user and upon determination that the event sound is not required then failing to provide the event sound to the user.

19. The PVA of claim 17 wherein said transmitting the response to the user communication further comprises transmitting the event sound as part of said response.

20. The PVA of claim 17 wherein said determining a response to the communication received from the user further comprises transmitting an audio anchor to the user to inform the user where they are in an application.

21. The PVA of claim 17 wherein said determining a response further comprises providing a call handle when the user is presented with a call leg.

22. The PVA of claim 17 further comprising providing the event sound to the user upon an occurrence of a predefined event.

23. The PVA of claim 17 wherein said event sound is selected from the group consisting of a record start/stop sounds, a working sound, an understood tone, a logon sound, a task due sound, a calendar reminder sound, and an inbound call sound.

24. The PVA of claim 17 wherein the user of said PVA can manually override the verbosity level set for said user by said PVA.

* * * * *